United States Patent [19]

Montaron

[11] 4,381,829
[45] May 3, 1983

[54] COLLISION DETECTION SYSTEM WITH SAFETY DEVICES

[75] Inventor: Bernard Montaron, Toulouse, France

[73] Assignee: Regie Nationale des Usines Renault, Boulogne Billancourt, France

[21] Appl. No.: 198,812

[22] Filed: Oct. 20, 1980

[30] Foreign Application Priority Data

Oct. 23, 1979 [FR] France ............................. 79 26208

[51] Int. Cl.³ .......................................... B60R 21/02
[52] U.S. Cl. ................................... 180/274; 180/282; 280/733; 280/735; 340/52 H
[58] Field of Search ................. 280/735, 733; 180/271, 180/274, 275, 276, 277, 278, 279, 281, 268, 282; 340/52 H

[56] References Cited

U.S. PATENT DOCUMENTS

| | | | |
|---|---|---|---|
| 3,622,974 | 11/1971 | Best et al. | 280/735 X |
| 3,633,159 | 1/1972 | Dillman et al. | 340/52 H |
| 3,701,903 | 10/1972 | Merhar | 280/735 X |
| 3,863,208 | 1/1975 | Balban | 340/52 H |
| 3,916,376 | 10/1975 | Tuttle | 280/735 X |
| 3,921,129 | 11/1975 | Sumida | 280/735 X |
| 3,964,016 | 6/1976 | Yamada et al. | 280/735 X |
| 4,087,782 | 5/1978 | Oishi et al. | 280/735 X |
| 4,117,730 | 10/1978 | Spies et al. | 340/52 H X |
| 4,178,016 | 12/1979 | Andres et al. | 340/52 H X |

FOREIGN PATENT DOCUMENTS

| | | |
|---|---|---|
| 2352897 | 4/1975 | Fed. Rep. of Germany . |
| 2271956 | 12/1975 | France . |
| 2345317 | 10/1977 | France . |
| 2366030 | 4/1978 | France . |
| 2357405 | 2/1979 | France . |

Primary Examiner—Joseph F. Peters, Jr.
Assistant Examiner—Milton L. Smith
Attorney, Agent, or Firm—Oblon, Fisher, Spivak, McClelland & Maier

[57] ABSTRACT

A system for use in a motor vehicle, made up of a group of sensors such as accelerometers, a microprocessor, and a group of passenger-safety devices. The sensors' inform the microprocessor of the levels of acceleration at different points in the vehicle. The microprocessor processes this information, checks the sensors' functioning, the power source and the safety devices. In the case of a strong shock, the microprocessor triggers the safety devices suited to the particular situation: electromagnetic door-openers, safety belts with pyrotechnic tightening action, inflatable air bags, and loosening devices for safety belts.

8 Claims, 5 Drawing Figures

COLLISION DETECTION SYSTEM WITH SAFETY DEVICES

BACKGROUND OF THE INVENTION

1. Field of the Invention

This invention relates to collison detectors and more particularly to an automatic system of collision detection for an automobile including safety devices which may be actuated in case of an impact.

2. Description of the Prior Art

Conventional shock sensors are generally made up of a inertial mass which is pulled toward the vehicle by the working of a return force, for example, a magnetic force or a drawback spring. The inertial mass travels in the direction of the acceleration it measures and upon the occurrence of a strong shock, strikes against a device which delivers an electrical signal. This device may produce the signal by establishing contact between two wires, for example. The inconvenience of this type of sensor is in the difficulty of testing the sensor's functioning during the vehicle's movement in the absence of shock, and in the impossibility of using the same sensor to operate diverse apparatus which would have to be set in motion independently for atypical shocks.

With certain devices of the prior art, the testing of a sensor's proper functioning is effected by measuring a parameter which is not the signal directly delivered by the sensor. This procedure is not sufficiently reliable. Indeed, an accelerometer including a force gauge attached to a vibrating blade can present a normal resistance and yet not give a signal. This can happen if the gauge becomes detached under the effect of the vehicle's vibrations. The same would be the case for a piezo-electrical sensor if its capacity were to be measured.

SUMMARY OF THE INVENTION

Accordingly, one object of this invention is to provide a novel collision detector capable of accurate and reliable operation.

Another object of the invention is to provide a collision detector which can check the condition of the sensor while in operation.

Another object of the invention is to provide a collision detector with a microprocessor for controlling its operation.

A further object of the invention is to provide a collision detector where testing is performed using a direct parameter for measurement.

A still further object of the invention is to provide a collision detector which operates safety devices upon the detection of a strong shock.

Another object of the invention is to provide a collision detector which stores in memory the valve of parameters.

Another object of the invention is to provide a collision detector with a memory which may be read out for maintenance purposes.

Briefly, these and other objects of the invention are achieved by providing a collision detector having several accelerometers, a microcomputer and several safety devices. Upon experiencing a strong shock, the safety devices are actuated to protect the passengers of the automobile. The microcomputer tests the functioning of the power supply, sensors and safety devices. The memory of the microcomputer stores the output of the sensors and the results of testing for maintenance purposes and for recording collision parameters.

The present invention utilizes sensors which deliver an electrical signal continually. A testing of the sensor's functioning is rendered possible by the existence of a signal triggered by the braking, acceleration, and vibrations of the vehicle.

Further, the present invention utilizes a procedure of great reliability to verify the sensors' functioning. Several sensors are used aboard a vehicle, in such a way as to ensure accurate detection in various types of collisions. It is therefore possible to establish correlations between sensors in order to detect the abnormal functioning of one or more sensors when less than half of them are failing. This checking is one of the functions of the microprocessor which makes up the system's central component. Another function fulfilled by the microprocessor is the computation, starting with the acceleration data furnished by the sensors', of certain parameters the degree of which determines the triggering of one or more of the safety devices. This system allows, through simple programming, a choice of several criteria, among a whole gamut of varied criteria, for the triggering of the safety devices. The broad versatility of such an apparatus facilitates notably its adjustment to the vehicle in use and permits the adaptation of the same system to all types of vehicles.

It is also desirable, in any system guaranteeing passenger safety, to keep an automatic check on the proper functioning of the safety devices. In the system of the present invention the microprocessor fulfills equally the functions of checking the proper functioning of the electrical supply, the safety devices and, in a general way, all the peripheral systems which are connected to it and which need to be checked. The failure of any part of the system is indicated to the passengers by a signal which can either be visual or auditory. In addition, a numerical code representing the failing element is recorded in the microprocessor's memory. This permits one to easily locate the failing element, even if its failing is only intermittent.

In the case of a collision, the microprocessor records in its memory the parameters of the shock and the triggerings of the various safety devices. The utilization of a supplementary electrical supply permits the safeguarding of this information in case the vehicle's battery should be destroyed.

The information contained in the microprocessor's memory may be read by means of an adapted component plugged into the system. This component can when necessary become part of the system itself.

That part of the microprocessor's memory reserved for the recording of information able to be read by this component is divided into two sections:

(1) a "diagnostic" section containing the codes of errors indicting the failing parts of the system; and
(2) a "shock" section containing the record of collision parameters and the phases of the ensemble of safety devices.

The "diagnostic" section is accessible to maintenance services to ensure upkeep of the material. The "shock" section is accessible to builders of the unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
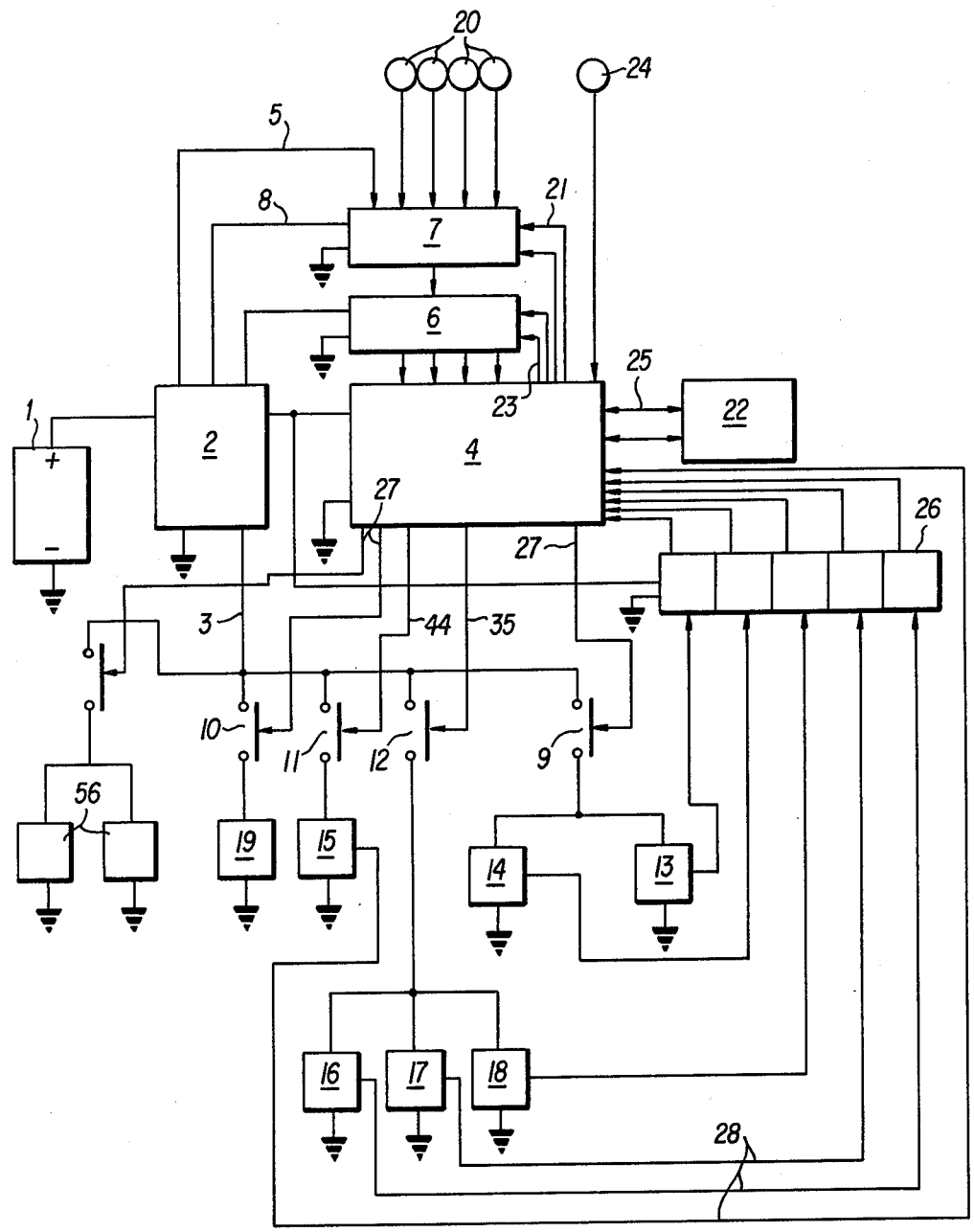
FIG. 1 is a block diagram illustrating the general structure of the invention.

Referring now to the drawings, wherein like reference numerals designate identical or corresponding parts throughout the several views, and more particularly to FIG. 1 thereof, element 1 represents the vehicle's battery, whose negative pole is connected to ground. The positive pole of battery 1 is connected to regulator 2, which is shown in detail in FIG. 2. Regulator 2, which produces a filtered and regulated electrical power supply and which contains a device providing supplementary current, is connected by one or more wires 3 to switches 9, 10, 11, 12 and 57 which could be electromagnetic relays or transistors, for example.

Regulator 2, connected to ground, ensures the power supply of the microprocessor 4, A-D converter 6, multiplexor 7, by way of wire 8 and comparing circuit 26. Regulator 2 is also connected to multiplexor 7 by wire 5. This connection does not provide power but gives information to 7 concerning the state of the power supply.

Mulitplexor 7 is connected to a group of sensors' 20 (4 for example), notably accelerometers. Regulator 2 is also connected to multiplexor 7 by a wire 5 transmitting a current proportional to the current of the power supply.

The selection of an input to the multiplexor 7 is controlled by the microprocessor 4 through connections 21. The output of the multiplexor 7 is connected to an analog to digital converter 6 which delivers a binary signal to the microprocessor 4.

The microprocessor 4 checks the functioning of the A-D converter 6 by means of wires 23. Sensor 24, which may be an accelerometer responding to any movement, or a sensor indicating whether the ignition contact is on or off, is connected to the microprocessor to indicate that the automobile is in operation.

The accelerometers 20 are distributed within the vehicle interior to measure to condition of the vehicle's essential parts.

Circuit 22, which could be, for example, a diagnostic instrument containing a microcomputer, can be connected to the microprocessor 4 in order to read the contents of certain sections of the microprocessor's memory. One or more outputs 27, 35, 44 of the microprocessor 4 operate safety devices 13, 14, 15, 16, 17, 18, 19, 56 by means of elements 9, 10, 11, 12, 57.

These devices could be, for example, an electromagnetic locking device 19 for the vehicle's doors, a signalling device 15 for indicating a failure in the system (for example a flashing light or a warning siren), one or more pyrotechnic devices 16, 17, 18 to trigger the inflation of protective airbags, one or more devices 13, 14 for operating mechanical or pyrotechnic tightening of safety belts, and one or more devices 56 for loosening safety belts and using, for example, explosive bolts at the belts' points of attachment.

The safety devices 13-18, whose proper functioning must be checked, are joined by wires 28 to the microprocessor 4. Some of these may be connected to intermediary elements 26, shown in detail in FIG. 4.

Figure 2:
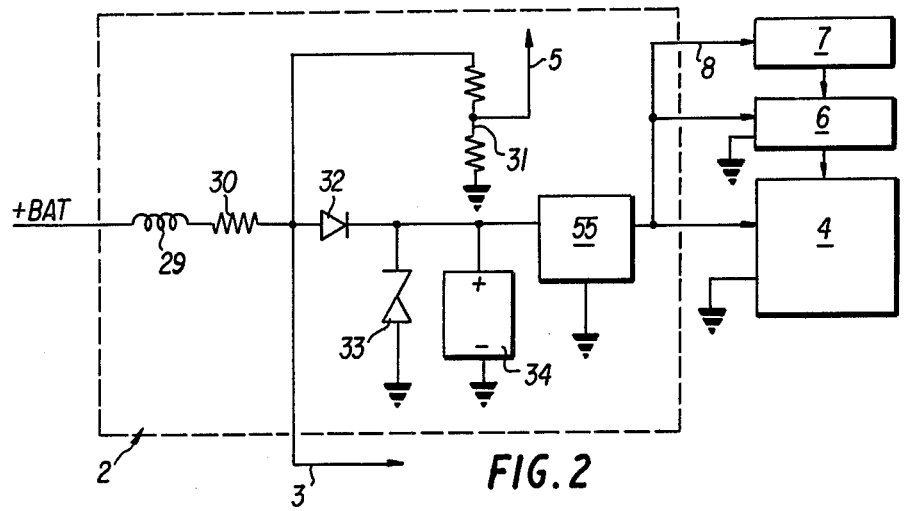
FIG. 2 is a circuit diagram showing a possible construction of regulator 2.

As shown in FIG. 2, the vehicle's battery 1 is joined to an inductance 29 in series with a resistance 30. These two elements lessen the positive current impulses coming from the battery. A current-divider 31, made up of two resistances, is connected to resistance 30. Output 5 supplies information to microprocessor 4 concerning the current supplied to the system through elements 6 and 7.

Wire 3, supplying current to the safety devices depicted in FIG. 1 is connected to resistance 30. A diode 32 protects the system from the negative current impulses coming from the vehicle's battery. A Zener didoe 33 absorbs any positive current impulses surpassing a given level.

A supplementary battery 34, including a device limiting the current, supplies power to the processor 4 when battery 1 is failing. The supplying of elements 4, 6, 7, is done through a current regulator 55.

Figure 3:
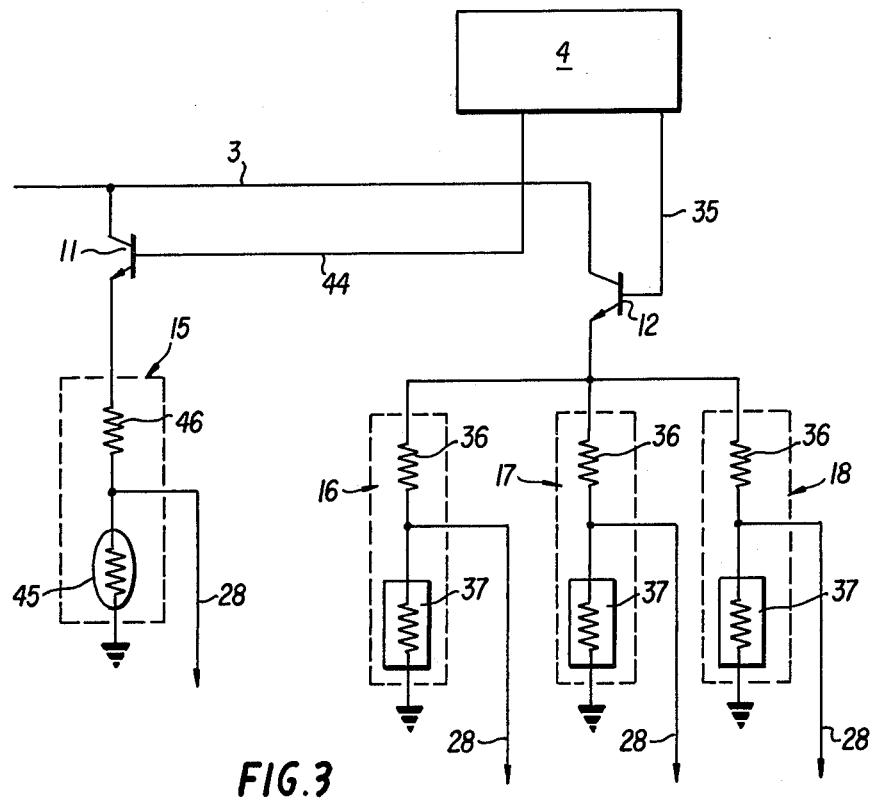
FIG. 3 is a circuit diagram illustrating the operation of pyrotechnic safety devices 13, 14, 16, 17, 18.

FIG. 3 illustrates one embodiment of the pyrotechnic devices and the device for signalling failures in the system.

The application of current to output 35 of the microprocessor 4 activates transistor 12 and permits the feeding of current to devices 16, 17, 18, each comprised of a resistance 36 in series with one or more heating resistors 37, which initiate the lighting of the pyrothechnical fuse.

Checking the proper functioning of one or more devices is made possible by the microprocessor 4 which leaves output 35 open to a strong current only for a very short time, that is 20–30 thousandths of a second. In this way, the energy dissipated in resistance 37 is too weak to create the heat necessary to trigger the safety device. The current carried by output 28 is a function of the ratio between resistances 37 and 36; it allows one to test the proper functioning of the entire device. This type of checking eliminates the problems caused by poor contacts, notably the turning contacts of the vehicle's steering wheel.

Let us take note that this test is not limited only to element 37, but is applicable to the entire operating line of the device. In the same way, microprocessor 4 checks flashing light 45.

Figure 4:
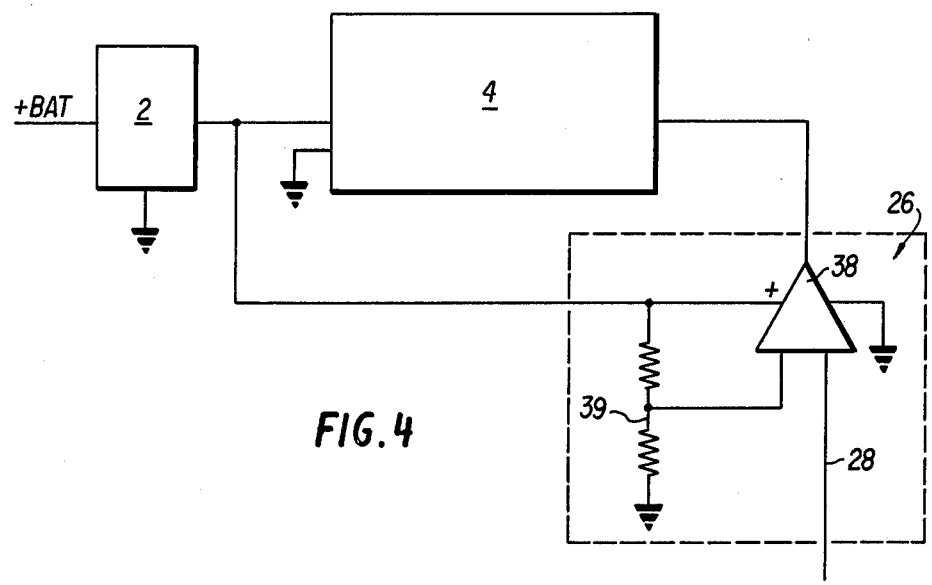
FIG. 4 is a circuit diagram showing a possible construction of comparing circuit 26.

FIG. 4 illustrates the use of comparing circuit 26. The current carried by wire 28 is compared, by means of comparator 38, to a fixed current delivered by current divider 39 connected to the regulated power supply 55 illustrated in FIG. 2. The comparator could be, for example, an operational amplifier functioning as a gauge.

Figure 5:
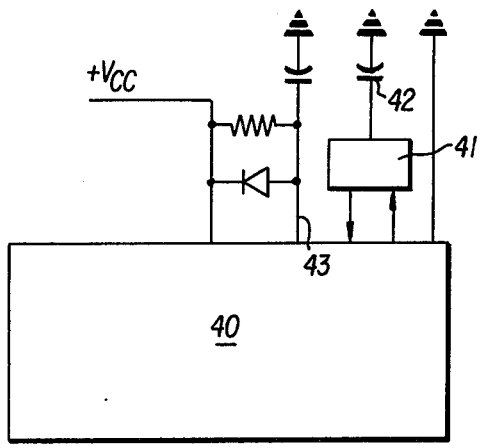
FIG. 5 shows one way of constructing the computer 4.

FIG. 5 presents certain supplementary devices which are used in conjunction with microprocessor 4. The microprocessor 4 is made up of one or more microprocessors 40. An oscillator 41, for example, a quartz or a resistance-capacity circuit, protected against interference by a capacitance 42, provides the necessary time signals for the microprocessor's clock. Output 43 is used to reset the microprocessor to zero.

When the system is functioning, the microprocessor executes a program stored in its memory by a certain number of steps to be carried out, such as the following (not necessarily in this order):

turning on the microprocessor, following the actuation of the triggering device;

acquisition of data furnished by the accelerometers 20 (and others);

acquisition of data indicating the current to be fed to the system, and data furnished by input 24;

measurement of the functioning of the safety devices and warning signals;

comparison of accelerometer data to certain thresholds fixed by the program and, in cases where the threshold is exceeded, actuation of an alarm procedure;

comparison among themselves of all accelerometer date, and investigation of the accelerometer giving off abnormally low signals. In the case of signals which are too low, the procedure for "failures" is instituted;

comparison, with certain comparison levels fixed by the microprocessor of acquired data concerning the electrical supply of the system, the safety devices and the signals, and in the case of a positive signal, the call to the procedure for "failure";

in the case of a call, the execution of a "failure" procedure, which consists of putting into the "diagnostic" section of the memory numerical codes characteristic of the defective components, and the triggering of the warning signal;

reading of inputs 25 and comparison of their levels to levels fixed by the microprocessor. In the case of a positive test result, the call to the "dialogue" procedure;

in the case of a call, the execution of "dialogue" procedure. According to the level of inputs 25, the microprocessor transimits to component 22 the content of one of the memory sections: "diagnostic" section or "shock" section;

in the case of a call, the execution of an alarm procedure. The microprocessor reads the accelerometer data and executes a computation starting with these data and with previous levels registered in the processor's memory. The microprocessor also computes the time elapsed after the triggering of the alarm procedure, starting with the signal given by the clock. The microprocessor compares calculated parameters to certain levels fixed by the program. According to the result of the comparison, the microprocessor either goes on to the alarm procedure, triggers the safety devices provided by the program, or else stops the alarm procedure and goes back to the normal execution of the program. With each triggering of a safety device, the microprocessor records in its "shock" memory section the computed parameters measuring the shock as well as a code representing the triggered devices. The information coming from certain wires 28 can also be recorded in the "shock" memory at time intervals prearranged by the program. When the computed parameters resume levels corresponding to a normal situation or when the time elapsed since the moment of collision exceeds a certain threshold fixed by the microprocessor and if certain devices have been activated, for example the inflatable air bags, then the microprocessor puts into operation elements 56, which free the passengers from their safety belts.

This list of steps is not restrictive; it could be expanded and each step further detailed.

With the purpose of diminishing the amount of electricity consumed by the system, it is possible to include a "constant watch" step.

If input 24, corresponding to the triggering contact, signals the cutting of contact, the microprocessor begins a tallying procedure, included in the execution of the program, and without interruption to this execution. The tallying lasts as long as the triggering contact is out; the reestablishment of the triggering contact nullifies the results of the tallying. As soon as the tally reaches a certain level fixed by the program (corresponding roughly to the passage of about 20 or 30 seconds), the microprocessor puts itself into a state of "constant watch". In this state it uses practically no more current, except that necessary to preserve the information stored in its memory.

The delayed action of putting itself into a state of constant watch prevents the possibility of the microprocessor's stopping its activities completely because of wires disconnected during a collision.

The verification of the accelerometers' proper functioning may be carried out by comparing each signal to the sum total of the other signals divided by a factor fixed by the microprocessor.

The alarm procedure is carried out by the application of a buckle; the time needed for this application remains more or less constant. In this way the microprocessor may compute the sum of the accelerations at each buckle for each sensor. The computed sums are proportional to the variations in the sppeds of the sensor. These variations may then be compared to levels fixed by the program.

In the alarm procedure, when the parameters measuring the shock resume levels corresponding to normal conditions, it is possible to include a supplementary step which checks the state of the principal electrical supply (vehicle's battery) and, according to the results of this check, either resumes the normal execution of the program or else executes the "failure" procedure and then goes into a state of constant watch.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A system for detecting a collision in a vehicle, comprising:

a plurality of sensor means for providing measurements based on the vehicle's acceleration;

a plurality of passenger safety means which are controlled by pyrotechnic actuated devices triggered by the function of triggering resistors;

computer means for receiving data from said sensor means and operating said passenger safety means in accordance wih said data;

wherein said data is compared to levels recorded in the computer means and said passenger safety means are actuated if said levels are exceeded; and testing means responsive to an output of said computer means for applying current for a short time to said triggering resistors so as not to trigger said devices wherein the current applied is equal in magnitude to the current which triggers said devices;

wherein the computer means operates in a manner to test the operation of the system and record any failures of operation.

2. The system for detecting a collision of claim 1, wherein the safety means include:
   safety belts which are tightened by pyrotechnic actuated devices; and
   air bags inflatable by pyrotechnic devices.

3. The system for detecting a collision of claim 1, wherein said computer means further comprises:
   memory means for recording said measurement when a collision occurs and said failures of operation.

4. The system for detecting a collision of claim 3, further comprising:
   a supplementary circuit means for reading out data from parts of said memory means, by plugging said supplementary circuit into said computer means.

5. The system for detecting a collision of claim 1, wherein:
   said sensors are of the piezoelectric type.

6. The system for detecting a collision of claim 1, wherein:
   the principal power source for the system is the vehicle battery; and
   wherein a supplementary power source is used in case of failure of the principal power source.

7. The system for detecting a collision of claim 1, wherein:
   said sensor means are tested by comparing the signal from each sensor means with the mean of the signals from a plurality of sensor means.

8. The system for detecting collision of claim 1, further comprising:
   warning signal means for indicating a failure of operation.

* * * * *